United States Patent
Yeon et al.

(10) Patent No.: US 12,397,612 B2
(45) Date of Patent: Aug. 26, 2025

(54) COOLING MEDIUM CIRCULATION APPARATUS FOR VEHICLE

(71) Applicant: Hyundai Wia Corporation, Gyeongsangnam-do (KR)

(72) Inventors: Je Min Yeon, Incheon (KR); Sang Min Lee, Gyeonggi-do (KR)

(73) Assignee: Hyundai Wia Corporation, Gyeongsangnam-do (KR)

( * ) Notice: Subject to any disclaimer, the term of this patent is extended or adjusted under 35 U.S.C. 154(b) by 0 days.

(21) Appl. No.: 18/537,254

(22) Filed: Dec. 12, 2023

(65) Prior Publication Data
US 2024/0217304 A1  Jul. 4, 2024

(30) Foreign Application Priority Data

Jan. 4, 2023  (KR) .................. 10-2023-0001461

(51) Int. Cl.
*B60H 1/00* (2006.01)
*F16K 5/04* (2006.01)
(Continued)

(52) U.S. Cl.
CPC ....... *B60H 1/00485* (2013.01); *F16K 5/0407* (2013.01); *F16K 5/0471* (2013.01); *F16K 11/0853* (2013.01); *F16K 27/065* (2013.01)

(58) Field of Classification Search
CPC ............. F16K 11/0853; F16K 11/0856; B60H 1/00485
See application file for complete search history.

(56) References Cited

U.S. PATENT DOCUMENTS 10,344,877 B2 * 7/2019 Roche .................. B60L 1/003
11,703,135 B2 * 7/2023 Gill .................. F16K 11/0856
137/625.47
(Continued)

FOREIGN PATENT DOCUMENTS

DE  10 2022 206 136 A1  12/2022
JP     2006-512540 A     4/2006
(Continued)

OTHER PUBLICATIONS

Office Action for German Patent Application No. 102023135763.8. (Year: 2025).*
(Continued)

*Primary Examiner* — Michael R Reid
(74) *Attorney, Agent, or Firm* — Fox Rothschild LLP

(57) ABSTRACT

A cooling medium circulation apparatus for a vehicle includes: a housing having a valve mounting device with an internal space and a plurality of ports connected to a plurality of thermal management components; and a valve body rotatably mounted in the valve mounting device, partitioned into a plurality of layers vertically, with a plurality of flow paths formed in each layer, and with a plurality of circulation holes formed on outer sides corresponding to each of the flow paths and selectively matching the ports, the circulation holes elongated vertically to have a height greater than a height of the flow paths. The cooling medium circulation apparatus may be installed in the vehicle in a compact manner, while eliminating the need for multiple peripheral pipes, and facilitating the circulation of coolant across various cooling system components.

20 Claims, 12 Drawing Sheets

(51) Int. Cl.
  *F16K 11/085*   (2006.01)
  *F16K 27/06*    (2006.01)

(56) References Cited

U.S. PATENT DOCUMENTS

| | | | |
|---|---|---|---|
| 11,988,290 B2 * | 5/2024 | Gill | F16K 11/0856 |
| 12,123,505 B2 * | 10/2024 | Tiemeyer | F16K 27/065 |
| 2006/0118066 A1 | 6/2006 | Martins | |
| 2022/0412473 A1 * | 12/2022 | Gray | F16K 11/083 |

FOREIGN PATENT DOCUMENTS

| | | |
|---|---|---|
| KR | 10-2018-0072781 A | 6/2018 |
| KR | 10-1959396 B1 | 3/2019 |
| KR | 10-2022-0042669 A | 4/2022 |
| KR | 10-2429374 B1 | 8/2022 |
| KR | 10-2023-0000981 A | 1/2023 |
| WO | 2017/223232 A2 | 12/2017 |

OTHER PUBLICATIONS

Office Action issued Feb. 21, 2024 in corresponding Korean Patent Application No. 10-2023-0001461.

Notice of Allowance issued Jun. 26, 2023 in corresponding Korean Patent Application No. 10-2023-0001461.

\* cited by examiner

COOLING MEDIUM CIRCULATION APPARATUS FOR VEHICLE

CROSS REFERENCE TO RELATED APPLICATION

The present application claims under 35 U.S.C. § 119(a) the benefit of Korean Patent Application No. 10-2023-0001461, filed Jan. 4, 2023, the entire contents of which are incorporated by reference herein.

BACKGROUND

(a) Technical Field

The present disclosure relates to a cooling medium circulation apparatus for a vehicle, more particularly, to the cooling medium circulation apparatus capable of being installed in the vehicle in a compact structure, while eliminating the need for multiple peripheral pipes, and facilitating the circulation of coolant across various cooling system components.

(b) Description of the Related Art

In recent years, the increasing prevalence of eco-friendly vehicles, such as electric vehicles and fuel cell vehicles, has spurred significant advancements in related technologies. For eco-friendly vehicles reliant on electric energy from batteries or the like, technical advancements in energy efficiency are essential.

In the case of eco-friendly vehicles without an engine as a heat source, thermal management of the vehicle through the use of electrical energy is important to overall thermal efficiency.

The thermal management of eco-friendly vehicles can be divided into a battery, an electronic device, and interior air conditioning segments. In particular, it is more efficient to manage these segments in an integrated system than in separate systems, as this allows for the active utilization of waste heat and the enhancement of the overall energy consumption efficiency of the vehicle.

Such an integrated thermal management system can be designed along with developing and implementing the necessary components in a way that saves space and reduces weight within the vehicle, making it possible to manufacture more efficient vehicles.

The related art described above is intended merely to aid in the understanding of the background of the present disclosure, and should not be construed as recognizing the prior art that is known to those skilled in the art.

SUMMARY

It is an object of the present disclosure to provide a cooling medium circulation apparatus capable of being installed in vehicles in a compact structure, eliminating the need of multiple peripheral pipes, and facilitating the circulation of coolant across various cooling system components.

In order to accomplish the above objects, a cooling medium circulation apparatus for a vehicle according to an embodiment of the present disclosure includes a housing comprising a valve mounting device with an internal space and a plurality of ports connected to a plurality of thermal management components, and a valve body rotatably mounted in the valve mounting device, partitioned into a plurality of layers vertically, with a plurality of flow paths formed in each layer, and with a plurality of circulation holes formed on outer sides corresponding to each of the flow paths and selectively matching the ports, the circulation holes elongated vertically to have a height greater than the height of the flow paths.

The valve mounting device is formed to have an inner surface forming a cylindrical shape, and the valve body is formed to have an outer surface forming a cylindrical shape facing the inner surface of the valve mounting device.

The cooling medium circulation apparatus further include an actuator connected to an upper or lower part of the housing to rotate the valve body to selectively establish a connection between the circulation holes of the valve body and the ports of the housing.

The plurality of ports are arranged at intervals on the outer surface of the valve mounting device.

The flow paths formed in one layer are separated from the flow paths formed in another layer.

The flow paths formed in one layer are vertically overlapped with the flow paths formed in another layer.

The circulation holes are cut to be recessed inward at a portion connected to the flow paths.

The cooling medium circulation apparatus further includes a sealing member disposed between the inner surface of the valve mounting device and the outer surface of the valve body, wherein the sealing member includes through-holes corresponding to the circulation holes.

The sealing member is cylindrical and is fixed in position when inserted into the valve mounting device, allowing the valve body to rotate relative to the sealing member.

The sealing member is provided with the through-holes in multiple quantities to match the quantities of the ports.

The ports of the housing are arranged at regular intervals, and the through-holes of the sealing member are arranged to match each port of the housing, allowing the distance between the through-holes to be also regularly spaced.

The circulation holes of the flow paths formed in one layer of the valve body and the circulation holes of the flow paths formed in another layer are alternately arranged along the outer surface of the valve body, and the through-holes within the sealing member are formed in fewer quantities than the circulation holes of the valve body and are arranged at intervals to match the circulation holes of the flow paths formed in one layer or the flow paths formed in another layer of the valve body, depending on the rotational position of the valve body.

The valve mounting device is open at the top or bottom, with a sloped inner surface that gradually widens in the open direction.

The valve body is formed with a sloped outer surface matching the sloped inner surface of the valve mounting device.

The housing includes a contact member having elastic and abrasion-resistant properties at the open portion of the valve mounting device to support the valve body.

The thermal management components comprise a water pump, and the housing comprises a mounting portion formed on a side thereof for attaching the water pump, and the mounting portion comprises a water pump port communicating with the water pump.

The water pump port has a height smaller than the height of the through-hole of the valve body.

The water pump port is positioned at the center of the circulation hole of the valve body.

The cooling medium circulation apparatus further includes a sealing member disposed between an inner surface of the valve mounting device and an outer surface of the valve body, wherein the sealing member comprises throughholes corresponding to the circulation holes and having a height larger than the height of the water pump port and smaller or equal to the height of the circulation hole.

The plurality of circulation holes are arranged, while one circulation hole is in an open state matched with the water pump port during the rotation of the valve body, for another circulation hole to be positioned to match the same water pump port and switch to the open state before the closure of the one circulation hole.

The cooling medium circulation apparatus further includes a reservoir attached to an upper part or lower part of the housing and storing the cooling medium.

The cooling medium circulation apparatus constructed as described above is advantageous in terms of being installed in a vehicle in a compact structure, eliminating the need of multiple peripheral pipes, and facilitating the circulation of coolant across various cooling system components.

Particularly, arranging the thermal management components such as the reservoir and water pumper centrally around the housing, allowing selective coolant circulation to each thermal management component through a signal valve and connection through each port without branch pipes offers advantages in terms of modularity for the cooling system components.

A vehicle may include a cooling medium circulation apparatus.

DETAILED DESCRIPTION

Figure 1:
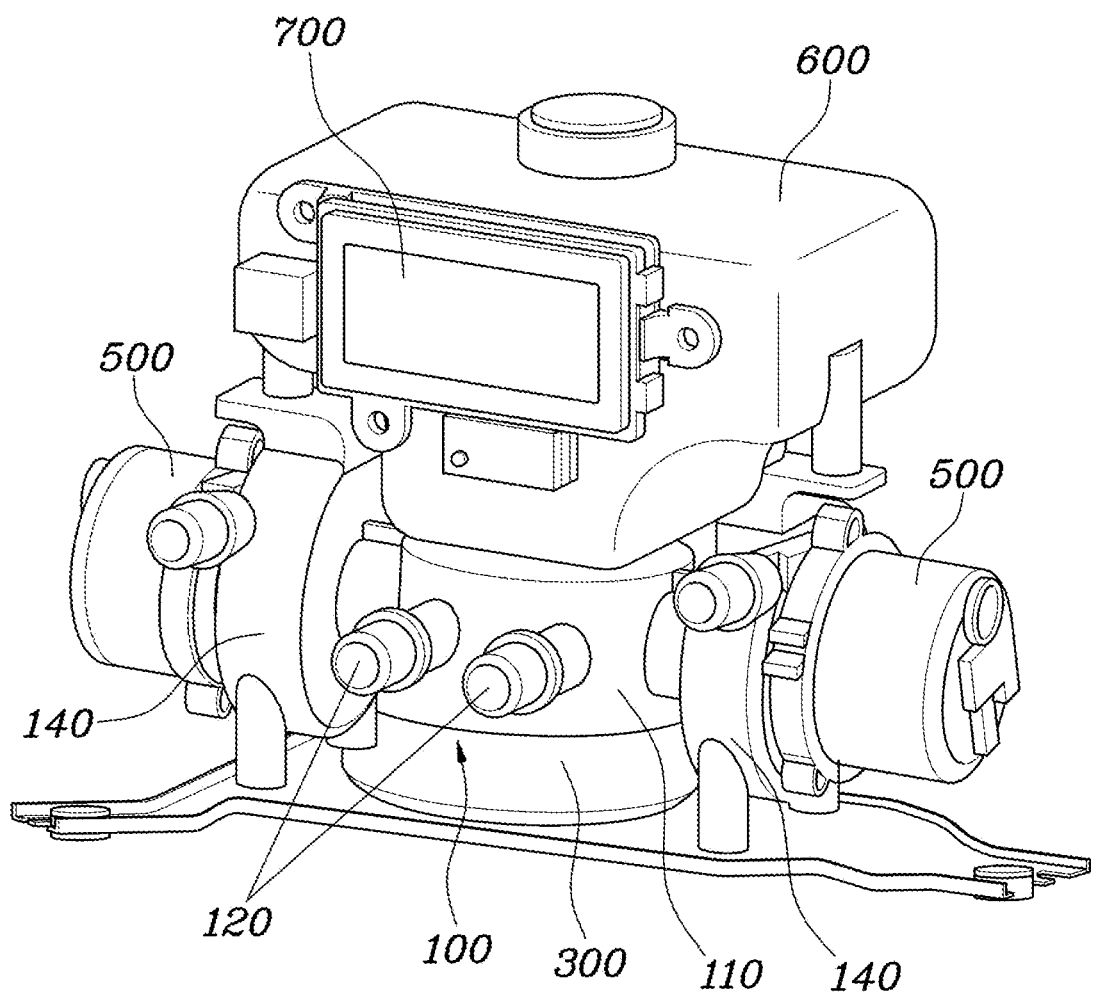
FIG. 1 is a diagram illustrating a cooling medium circulation apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, descriptions are made of the embodiments disclosed in the present specification with reference to the accompanying drawings in which the same reference numbers are assigned to refer to the same or like components and redundant description thereof is omitted.

In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

Hereinafter, a description is made of the cooling medium circulation apparatus according to a preferred embodiment of the present disclosure with reference to accompanying drawings.

Figure 2:
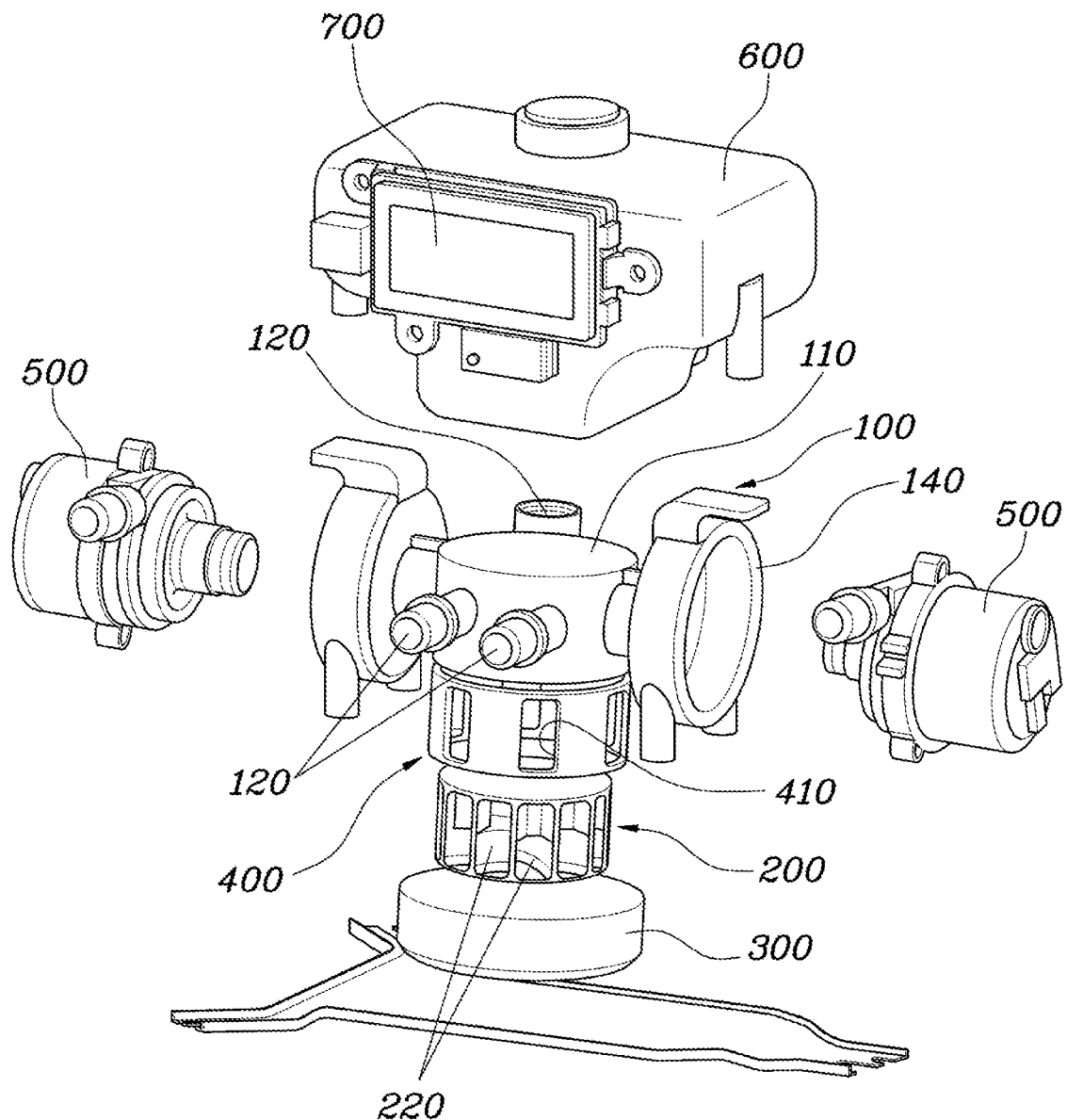
FIG. 2 is an exploded view of the cooling medium circulation apparatus of FIG. 1.
Figure 3:
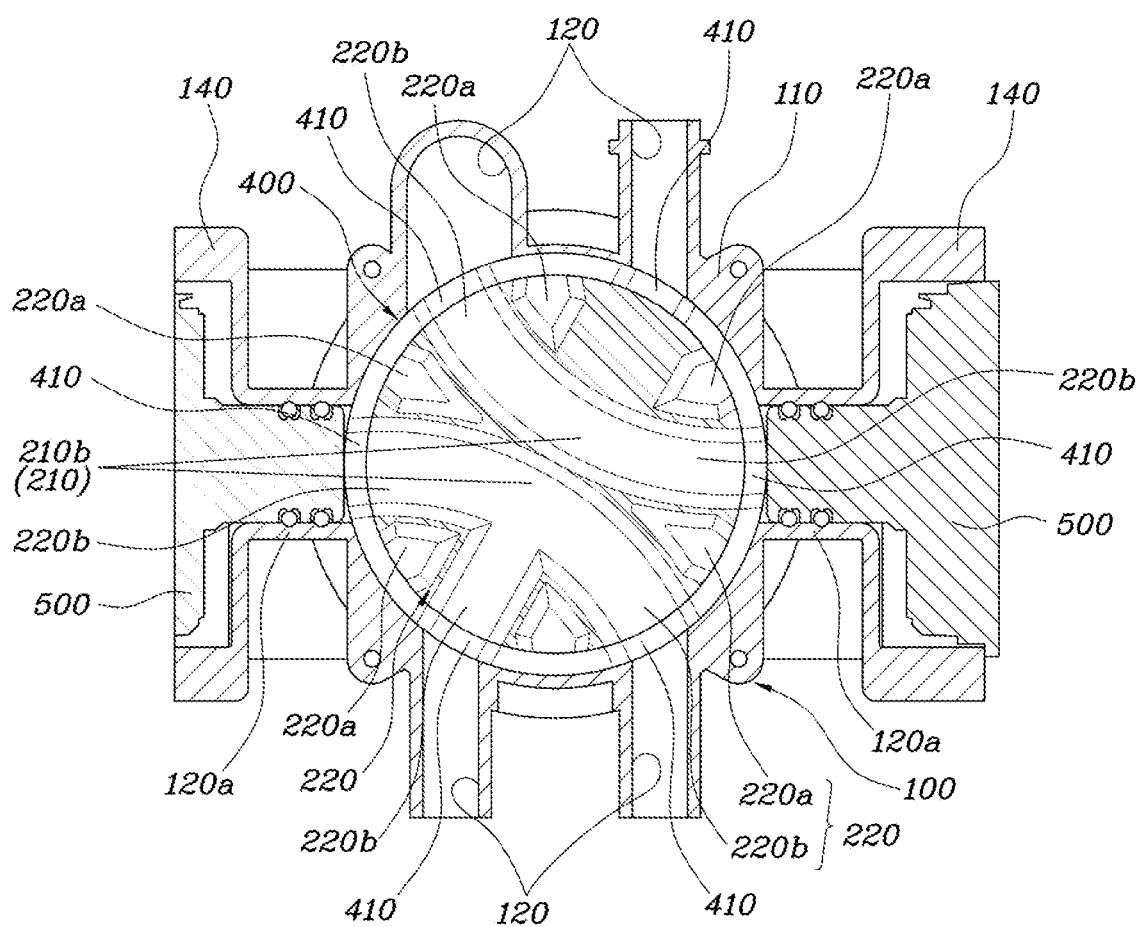
FIG. 3 is a cross-sectional view illustrating a plurality of flow paths and valve bodies of the cooling medium circulation apparatus of FIG. 1.
Figure 4:
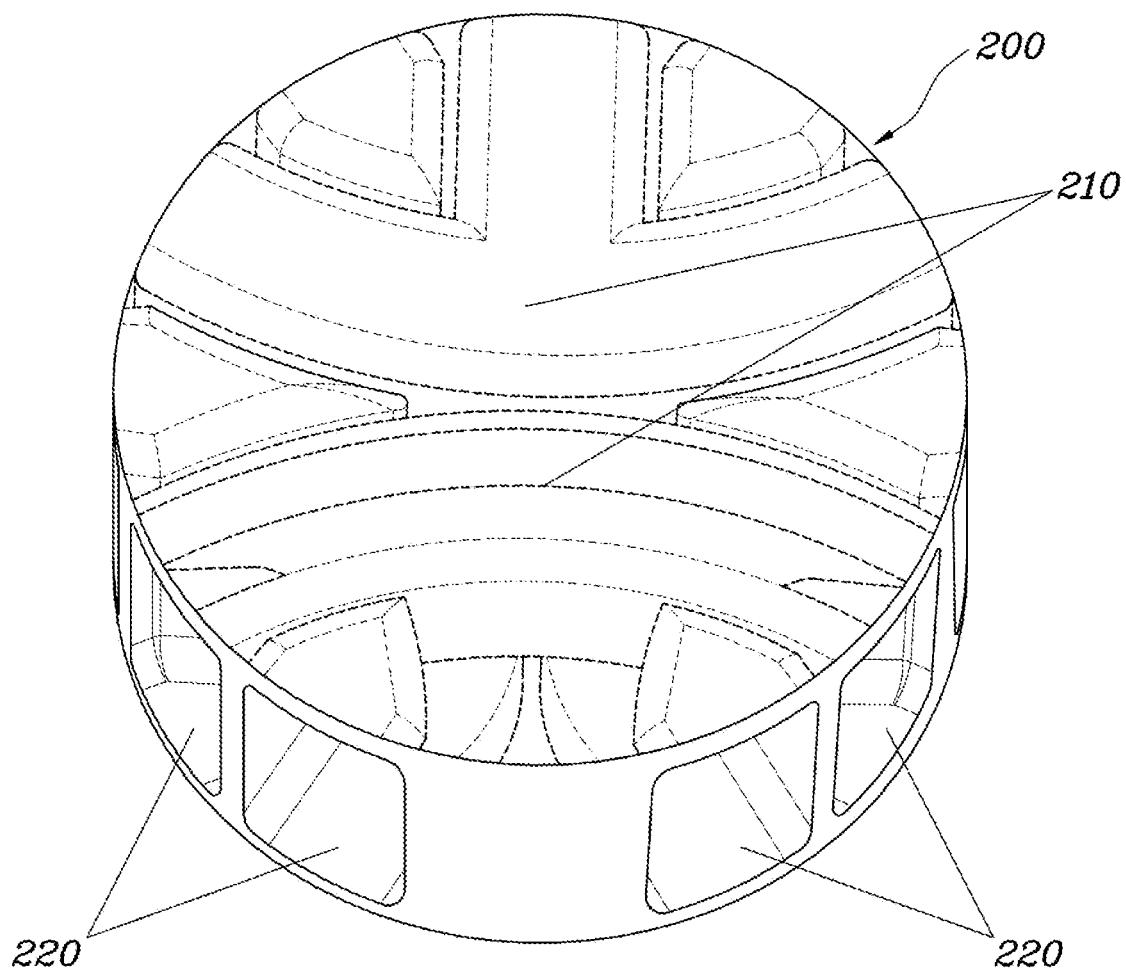
FIG. 4 is a diagram illustrating a valve body of the cooling medium circulation apparatus of FIG. 1.
Figure 5:
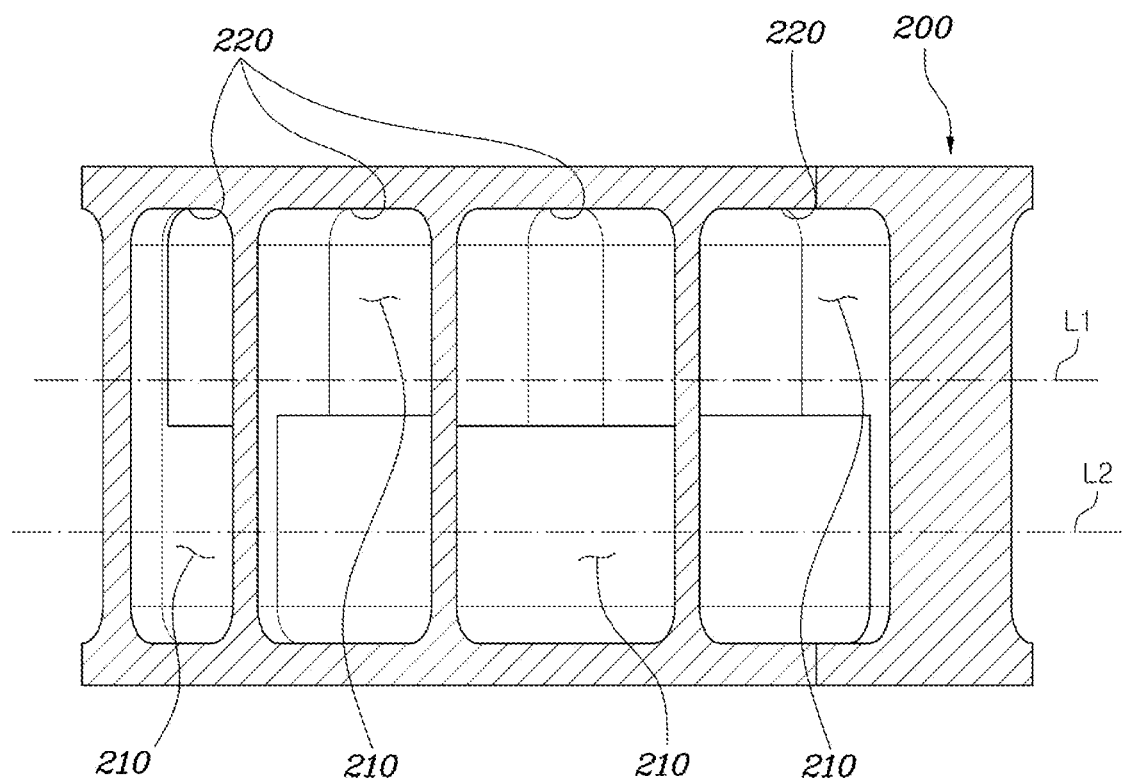
FIG. 5 is a cross-sectional view illustrating layers of the valve body of the cooling medium circulation apparatus of FIG. 1.
Figure 6:
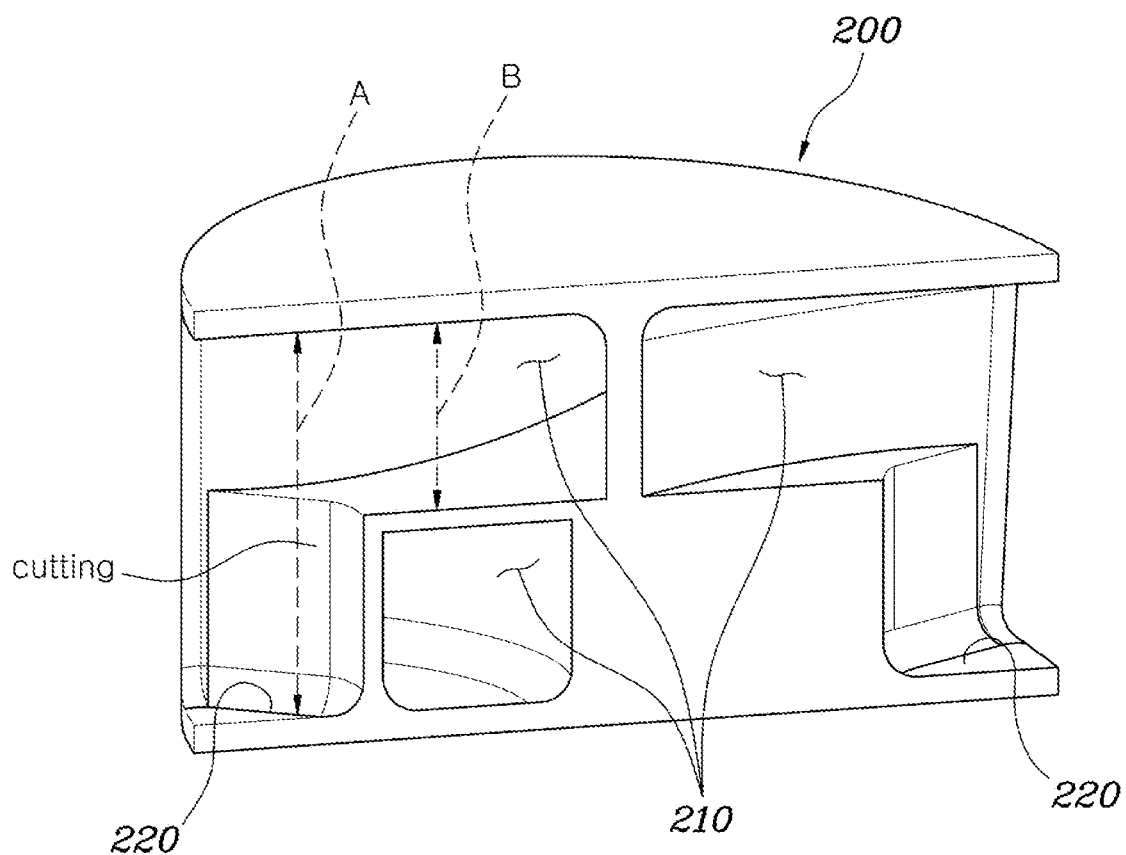
FIG. 6 is a vertical cross-sectional view of the body valve of FIG. 5.
Figure 7:
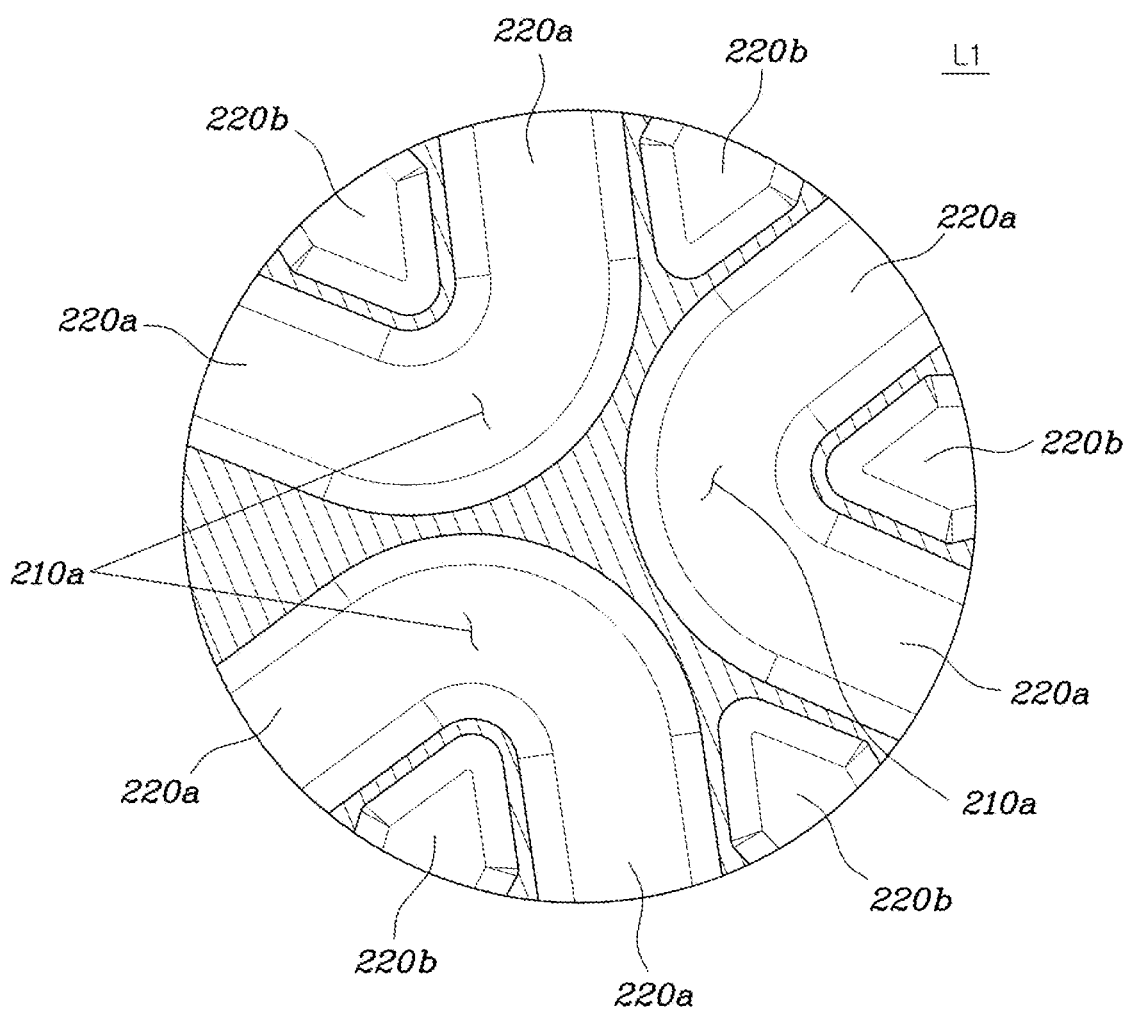
FIG. 7 is a cross-sectional view in accordance with a first layer of the valve body of FIG. 5.
Figure 8:
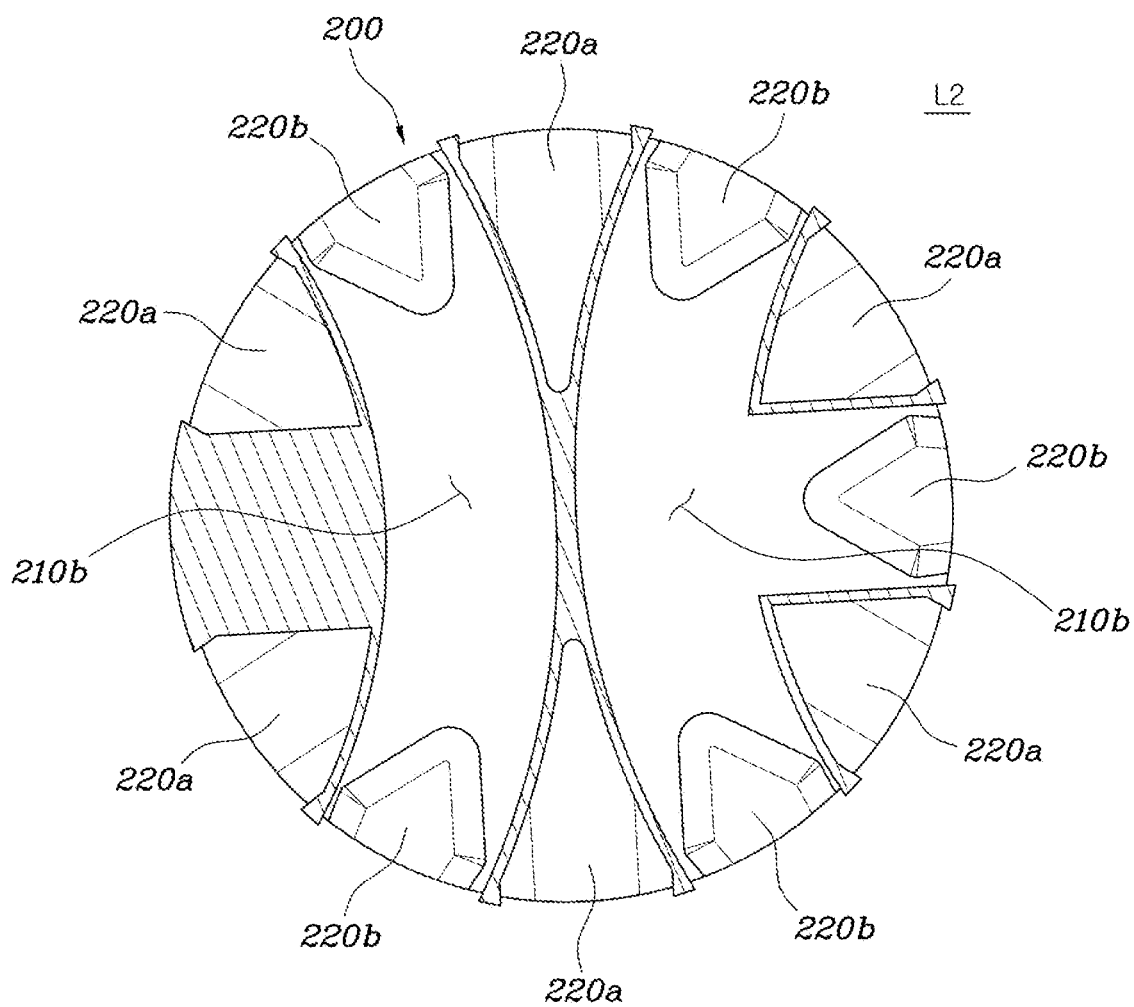
FIG. 8 is a cross-sectional view in accordance with a second layer of the valve body of FIG. 5.

FIG. 1 is a diagram illustrating a cooling medium circulation apparatus according to an embodiment of the present disclosure, FIG. 2 is an exploded view of the cooling medium circulation apparatus of FIG. 1, FIG. 3 is a cross-sectional view illustrating a plurality of flow paths and valve bodies of the cooling medium circulation apparatus of FIG. 1, FIG. 4 is a diagram illustrating a valve body of the cooling medium circulation apparatus of FIG. 1, FIG. 5 is a cross-sectional view illustrating layers of the valve body of the cooling medium circulation apparatus of FIG. 1, FIG. 6 is a vertical cross-sectional view of the body valve of FIG. 5, FIG. 7 is a cross-sectional view in accordance with a first layer of the valve body of FIG. 5, and FIG. 8 is a cross-sectional view in accordance with a second layer of the valve body of FIG. 5.

Figure 9:
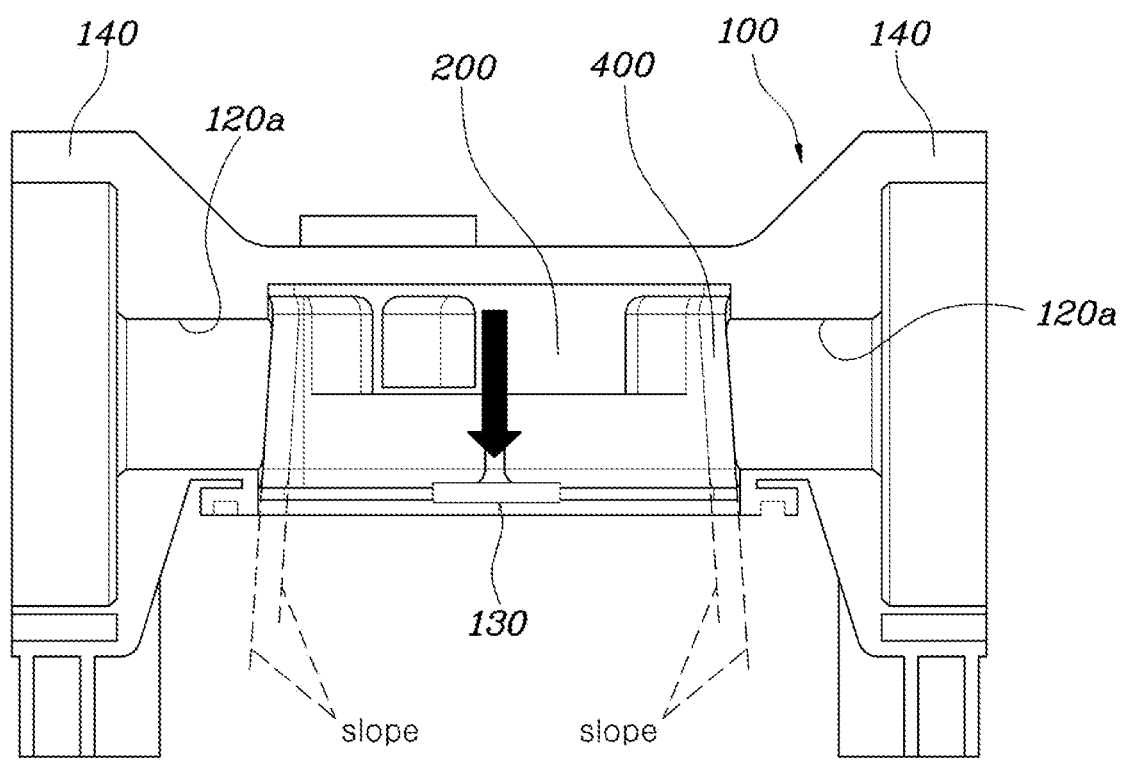
FIG. 9 is a diagram illustrating another embodiment of the cooling medium circulation apparatus of FIG. 1.
Figure 10:
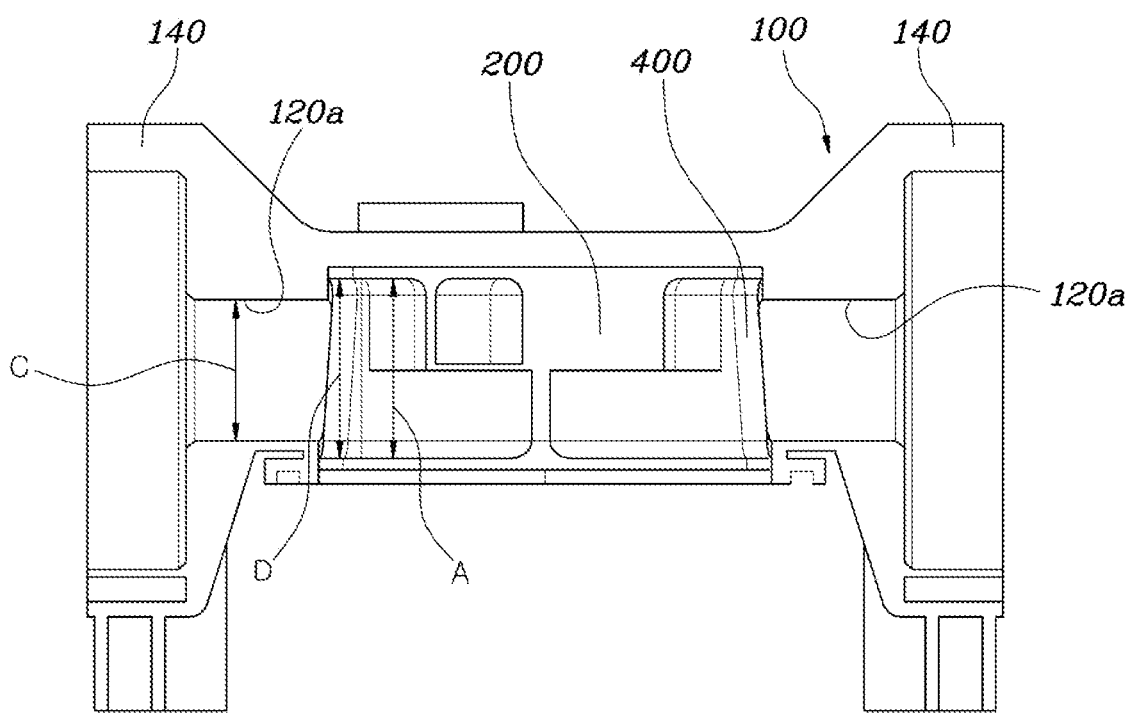
FIG. 10 is a diagram illustrating a water pump port of the cooling medium circulation apparatus of FIG. 1.
Figure 11:
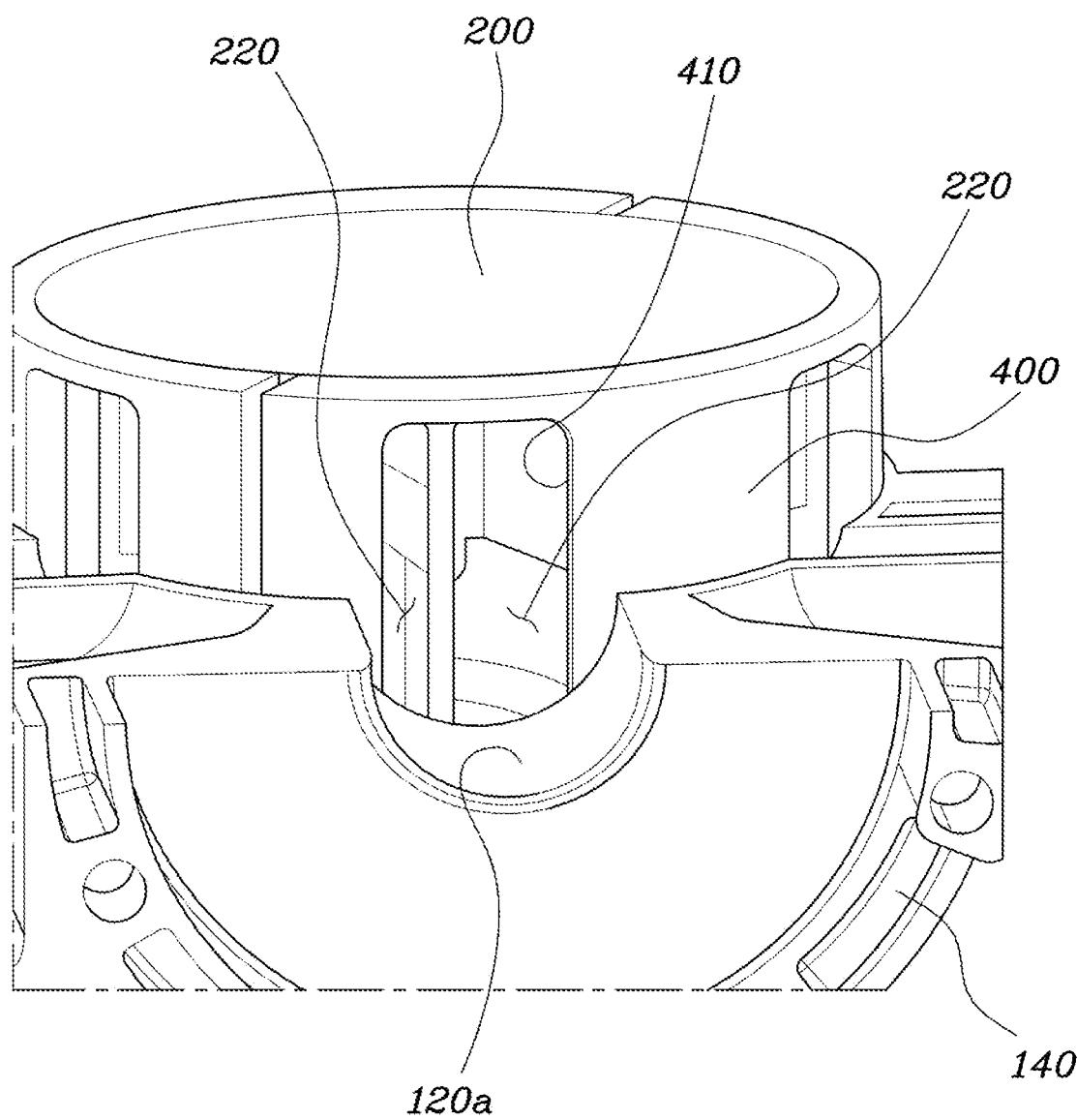
FIG. 11 is a diagram illustrating another embodiment of the cooling medium circulation apparatus of FIG. 1.

FIG. 9 is a diagram illustrating another embodiment of the cooling medium circulation apparatus of FIG. 1, FIG. 10 is a diagram illustrating a water pump port of the cooling medium circulation apparatus of FIG. 1, and FIG. 11 is a diagram illustrating another embodiment of the cooling medium circulation apparatus of FIG. 1.

Figure 12:
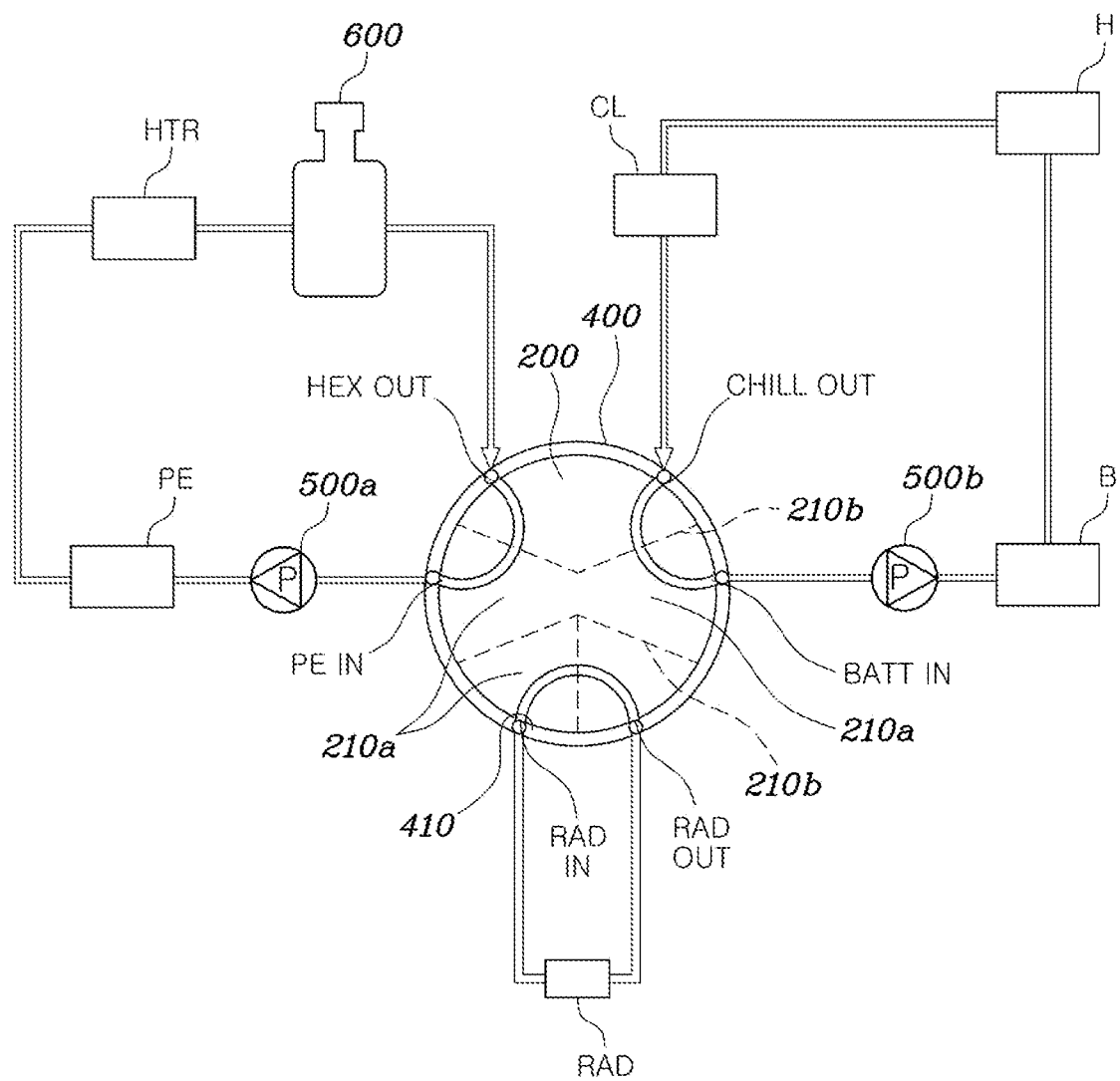
FIG. 12 is a diagram illustrating a configuration of an integrated thermal management system employed a cooling medium circulation apparatus according to an embodiment of the present disclosure.

FIG. 12 is a diagram illustrating a configuration of an integrated thermal management system employed a cooling medium circulation apparatus according to an embodiment of the present disclosure.

As shown in FIGS. 1 to 8, the cooling medium circulation apparatus according to an embodiment of the present disclosure includes a housing 100 equipped with a valve mounting device 110 with an internal space and ports 120 connected to a plurality of thermal management components, and a valve body 200 that is rotatably mounted in the valve mounting device 110, partitioned into a plurality of layers vertically, with a plurality of flow paths 210 formed in each layer, and with circulation holes 220 formed on the outer sides corresponding to each flow path 210 and selectively matching the ports 120, the circulation holes 220 elongated vertically to have a height A greater than the height B of the flow paths 210.

The housing 100 is provided with the valve mounting device 110 in order for the valve body 200 is rotatably mounted inside the valve mounting device 110. By forming the valve mounting device 110 inside the housing 100, the structure may become more compact as the valve body 200 is positioned within the housing 100.

An actuator 300 and a reservoir 600 may be coupled to the upper or lower part of the housing 100. The reservoir 600 is configured to store the cooling medium, while the actuator 300 is connected to the valve body 200, allowing for the rotation of the valve body 200.

According to an embodiment of the present disclosure, the housing 100 is configured to smoothly circulate the colling medium stored in the reservoir connected at the upper part thereof and to ensure no interference between the actuator 300 connected at the lower part thereof and other components positioned within the housing 100.

In this way, the reservoir 600 and actuator 300 are mounted on the upper and lower parts of the housing 100, respectively, and the water pump 500 to be described later is mounted on the side, thereby reducing the overall package.

The actuator 300 may be controlled by a controller 700, and the controller 700 may be mounted on the reservoir 600.

The valve mounting device 110 of the housing 100 is equipped with a plurality of ports 120, which may be arranged on the side of the housing 100 to be spaced apart from each other.

Here, the plurality of ports 120 are arranged along the circumference of the valve mounting device 110, facilitating the connection of the cooling medium circulation line to the ports 120 and preventing interference with other components.

Meanwhile, the valve mounting device 110 is designed to allow the valve body 200 to rotate, and depending on the rotational position of the valve body 200, the circulation direction of the cooling medium through the flow paths 210 is switched by matching the circulation holes 220 to the ports 120.

In addition, the inner surface of the valve mounting device 110 and the outer surface of the valve body 200 are cylindrically shaped, allowing the outer surface of the valve body 200 to face the inner surface of the valve mounting device 110.

That is, the valve mounting device 110 may be formed in a cylindrical shape recessed into the inside of the housing 100. The valve mounting device 110, designed as such, accommodates the cylindrical valve body 200 to rotate coaxially.

The plurality of ports 120 of the valve mounting device 110 and the plurality of circulation holes 220 of the valve body 200 may be selectively matched depending on the rotational position of the valve body 200, allowing the cooling medium to circulate through each thermal management component. This makes it possible to implement various thermal management modes by diversifying the circulation direction of the cooling medium depending on the rotational position of the valve body 200.

Meanwhile, in the present disclosure, the valve body 200 is divided into a plurality of layers vertically, with a plurality of flow paths 210 formed in each layer. That is, the valve body 200 has a plurality of flow paths 210 formed in each layer, and each flow path 210 may have a plurality of circulation holes 220 serving as the inlet and outlet.

Accordingly, the valve body 200 has multiple flow paths 210 configured for each layer, resulting in a greater number of circulation holes 220 compared to the number of flow paths 210, each serving as the inlet and outlet for the flow paths 210.

The circulation holes 220 are arranged at intervals along the outer surface of the valve body 200 and are each elongated vertically to have a height A longer than the height B of the flow paths 210. As a result, the cooling medium may flow through the flow paths 210 via the circulation holes 220 of the valve body 200, ensuring a sufficient flow rate. Furthermore, separating the circulation for each flow path 210 via the plurality of circulation holes 220 can make it possible to precisely control the circulation direction of the cooling medium.

An embodiment of the present disclosure is directed to an exemplary configuration with two layers, the first layer L1 provided with a total of 3 flow paths 210 and 6 circulation holes 220 corresponding to each flow path 210 and the second layer L2 provided with a total of 2 flow paths 210 and 5 circulation holes 220 corresponding to each flow path 210. In order to aid in understanding the disclosure, the flow paths 210a and circulation holes 220a corresponding to the first layer L1 and the flow paths 210b and circulation holes 220b corresponding to the second layer L2 are illustrated separately in FIGS. 7 and 8.

These layers may be provided in various forms without being limited to this embodiment.

In particular, the flow paths 210 formed in one layer may be separated from the flow paths 210 formed in another layer in the present disclosure.

The flow paths 210 formed in one layer may also be vertically or horizontally overlapped with the flow paths 210 formed in another layer.

That is, the valve body 200 may be partitioned into a plurality of layers formed each to have the flow paths 210.

Here, the flow paths 210 are formed to be arranged at intervals from each other within the first layer L1 of the valve body 200.

The flow paths 210 of the second layer L2 are formed to be vertically separated from the flow paths 210 of the first layer L1 and arranged at intervals from each other within the second layer L2. This arrangement allows the flow paths 210 of the second layer L2 to be vertically overlapped with the flow paths 210 of the first layer L1 and aligned on a vertical line together, thereby reducing the overall size of the valve body 200.

The flow paths 210 of the first and second layers L1 and L2 are positioned and oriented differently within the valve body 200, allowing for the rotation of the valve body 200 to form cooling medium flows in various directions.

The circulation holes 220 on the outer surface of the valve body 200 are spaced apart from each other to correspond to the flow paths 210 of the first and second layers L1 and L2, allowing for distinction between the inlet and outlet of each flow path 210.

Meanwhile, the circulation holes 220 may be cut to be recessed inward at a portion connected to the flow paths 210.

As shown in FIG. 6, the circulation holes 220 are cut to be recessed inward at the portion connected to the flow paths 210, allowing for the smoothly entry of the cooling medium into the flow paths 210 through the circulation holes 220. Here, the portion where the circulation holes 220 connect to the flow paths 210 may be V-cut, and the cutting shape may be applied in various forms.

Meanwhile, a sealing member 400 may be interposed between the inner surface of the valve mounting device 110 and the outer surface of the valve body 200, and the sealing member 400 may have through-holes 410 corresponding to the circulation holes 220.

The sealing member 400 is cylindrical and is fixed in position when inserted into the valve mounting device 110, allowing the valve body 200 to rotate relative to the sealing member 400.

The through-holes 410 of the sealing member 400 may be formed in the same number as the ports 120 of the housing 100 and may be shaped to match the circulation holes 220 of the valve body 200.

Accordingly, the sealing member 400 ensures a sealed configuration, except for the through-holes 410, allowing the circulation holes 220 matched with the through-holes 410 to facilitate the flow of the cooling medium, while blocking the circulation holes 220 unmatched with through-holes 410 to block the circulation of the cooling medium, depending on the rotational position of the valve body 200.

The sealing member 400 may be provided with the through-holes 410 in multiple quantities to match multiple ports 120.

Here, the ports 120 of the housing 100 may be arranged at regular intervals, and the through-holes 410 of the sealing member 400 may be formed in an equal number to match the ports 120, or in a greater number.

In the case of being formed in the equal number, the through-holes 410 of the sealing member 400 may be arranged at the same intervals as the ports 120, ensuring a precise alignment between the through-holes 410 and the respective ports 120.

In the case of being formed in the greater number, the through-holes 410 of the sealing member 400 may each be arranged to match each port 120, with some through-holes 410 redundantly matching one port 120. This allows for diversifying the circulation of the cooling medium for each port 120 depending on the rotational position of the valve body 200.

According to an embodiment of the present disclosure, the ports 120 of the housing 100 are arranged at regular intervals, and accordingly, the through-holes 410 of the sealing member 400 are formed to match the number and spacing of the ports 120, as shown in FIG. 3. As a result, the sealing member 400 is arranged with the remaining parts, excluding the through-holes 410, at equidistant intervals between the inner surface of the valve mounting device 110 and the outer surface of the valve body 200, allowing the circumferential surface to maintain a uniform contact state with balanced repulsive force between the valve mounting device 110 and the valve body 200.

Also, the valve body 200 may have the circulation holes 220 of the flow paths 210 formed in one layer and the circulation holes 220 of the flow paths 210 formed in another layer alternately arranged along the outer side, and the sealing member 400 may have the through-holes 410 fewer in number than the circulation holes 220 of the valve body 200 and arranged at intervals to match either the circulation holes 220 of the flow paths 210 formed in one layer or the circulation holes 220 of the flow paths 210 formed in another layer depending on the rotational position of the valve body 200.

That is, the circulation holes 220 of the valve body 200 may be distinguished by each flow path 210 formed in each layer, and the circulation holes 220 corresponding to the flow paths 210 formed in each layer may be alternately arranged at regular intervals.

The through-holes 410 of the sealing member 400 may be formed in the same quantity as the number of ports 120 and thus being fewer in number than the circulation holes 220 of the valve body 200. In particular, the plurality of through-holes 410 are formed to be spaced apart from each other to match the circulation holes 220 of the flow paths 210 formed in one of the plurality of layers, and depending on the rotational position of the valve body 200, the through-holes 410 may be aligned with the circulation holes 220 of the flow paths 210 formed in one layer or the circulation holes 220 of the flow paths 210 formed in another layer.

For example, FIG. 3 shows the second layer L2 among the plurality of layers in the case where the valve body 200 is rotated to align the circulation hole 220b corresponding to the second layer L2 with the through-hole 410 of the sealing member 400, which aligns the circulation hole 220b of the second layer L2, the through-hole 410 of the sealing member 400, and the port 120 of the housing 100, allowing for the circulation of the cooling fluid. On the other hand, the circulation holes 220a corresponding to the first layer L1 are closed off by matching with the body surface of the sealing member 400, preventing the circulation of the cooling fluid.

As described above, the present disclosure may be configured to allow the cooling fluid to flow through either the circulation holes 220a corresponding to the first layer L1 or the circulation holes 220b corresponding to the second layer L2 of the plurality of layers, depending on the rotational position of the valve body 200, as described above.

Meanwhile, as shown in FIG. 9, the valve mounting device 110 may be open at the top or bottom, with a sloped inner surface that gradually widens towards the opening.

In addition, the valve body 200 may be formed to have an outer surface sloped to match the inner surface of the valve mounting device 110.

In this way, the inner surface of the valve mounting device 110 and the outer surface of the valve body 200 are formed with a slope, allowing the valve body 200 to move in the direction of the opening of valve mounting device 110 by the force generated during the circulation of the cooling fluid.

The valve mounting device 110 has a sloped inner surface that gradually widens in the direction of the opening, and the valve body 200 is also formed with a sloped outer surface matching the sloped inner surface of the valve mounting device 110, thereby reducing friction against the valve mounting device 110 as the valve body 200 moves in the direction of the opening of the valve mounting device 110 under the force of the circulating medium. That is, the tapered shape applied to both the valve mounting device 110 and the valve body 200 is capable of preventing potential damage by reducing the friction generated on the valve mounting device 110 as the valve body 200 rotates in the state where the valve body 200 inserted into the valve mounting device 110 is in contact with the valve mounting device 110.

Here, the housing 100 is provided with a contact member 130 having elastic and abrasion-resistant properties at the open portion of the valve mounting device 110, thereby allowing the valve body 200 to be supported by the contact member 130. The contact member 130 is provided at the open portion of the valve mounting device 110 to support the valve body 200 and may also be provided in the actuator 300. The contact member 130 may be composed of a material with elasticity and abrasion resistance to facilitate the rotation of the valve body 200 and minimize damage due to friction.

As a result, the valve body 200 can ensure operational performance and durability when inserted into the valve mounting device 110.

Meanwhile, as shown in FIG. 2 and FIG. 10, the thermal management components include a water pump 500, and the housing 100 may be provided with a mounting portion 140 on its side for mounting the water pump 500, the mounting portion 140 having a water pump port 120a communicating with the water pump 500.

In an embodiment of the present disclosure, the water pump 500 is mounted on the side of the housing 100, and a mounting portion 140 is formed on the housing 100 for mounting the water pump 500. The mounting portion 140 of the housing 100 may be formed to match the outer shape of the water pump 500 to allow the water pump 500 to be attached, and the water pump port 120a may be formed at the center, allowing the cooling medium propelled by the water pump 500 to flow through the water pump port 120a into the valve body 200. Here, the water pump port 120a may be implemented in the form of a hole.

Here, the height C of the water pump port 120a may be formed to be smaller than the height A of the circulation hole 220 of the valve body 200.

In the present disclosure, the direct connection of the water pump 500 to the housing 100 necessitates the improvement of the circulation flow of the cooling medium during the operation of the water pump 500. Accordingly, it is necessary to design the water pump port 120a with a height C smaller than the height A of the circulation hole 220 in the valve body 200 to prevent any blockage of the cooling medium caused by the reduction in the flow path 210, stabilizing the circulation flow between the water pump 500 and the valve body 200.

Along with this, positioning the water pump port 120a at the center of the circulation hole 220 of the valve body 200 minimizes the reduction in the flow path 210 during the matching between the water pump port 120a and the circulation hole 220 of the valve body 200, preventing interference in the flow of the cooling medium and enhancing the flow characteristics of the cooling medium.

In addition, the height D of the through-hole 410 is larger than the height C of the water pump port 120a and smaller than or equal to the height A of the circulation hole 220.

Thus, forming the through-hole 410 of the sealing member 400, positioned between the inner surface of the valve mounting device 110 and the outer surface of the valve body 200, to have the height D equal to or less than the height A of the circulation hole 220 of the valve body 200 may allow the valve body 200 to maintain a closed state even if there is any misalignment or offset.

Additionally, as the height D of the through-hole 410 is greater than the height C of the water pump port 120a, it becomes possible to prevent a decrease in the flowability of the cooling medium caused by the reduction in the flow path 210.

In this way, by regulating the sizes of the water pump port 120a of the housing 100, the circulation hole 220 of the valve body 200, and the through-hole 410 of the sealing member 400 during the installation of the water pump 500 on the housing 100, it is possible to improve the flowability of the cooling medium and ensure reliability against any blockages of the cooling medium.

Meanwhile, as shown in FIG. 11, the plurality of circulation holes 220 may be arranged such that while one circulation hole 220 is in an open state matched with the water pump port 120a during the rotation of the valve body 200, another circulation hole 220 can be positioned to match the same water pump port 120a and switch to the open state before the closure of the first circulation hole 220.

In this way, the plurality of circulation holes 220 may be arranged adjacent to each other on the outer surface of the valve body 200 through the arrangement of the flow paths 210 of each layer.

That is, the position change of the valve body 200 may block the circulation of the cooling medium through the water pump port 120a, resulting in momentary high load on the water pump 500 and causing problems such as noise, cavitation, air bubbles, etc. Accordingly, in the present disclosure, during the rotation of the valve body 200, while one of the plurality of circulation holes 220 is in an open state matching the water pump port 120a, another one of the circulation holes 220 transitions to the open state before the first circulation hole 220 transitions to the closed state, ensuring uninterrupted flow of the cooling medium, thereby improving the durability of the water pump 500 and minimizing noise and cavitation during the transition operation of the valve body 200.

The present disclosure described above can diversify the flow of the cooling medium depending on the rotational position of the valve body 200, allowing for the diversification of the cooling function according to the flow direction of the cooling medium.

FIG. 12 shows an integrated thermal management system employing a cooling medium circulation apparatus including the valve body 200 with 11 circulation holes 220 and the sealing member 400 with 6 through-holes 410 according to an embodiment of the present disclosure. In the drawing, the PE IN port is connected to the HEX OUT port through a first water pump 500a, a power electronics PE, a heat exchanger HTR, and a reservoir 600. The RAD IN port is connected to the RAD OUT port through the radiator RAD. The BATT IN port is connected to the CHILL OUT port through a second water pump 500b, a battery B, a heater H, and a chiller CL. This connection setup allows for independent control of the cooling medium flow to the power electronics PE, radiator RAD, and battery B by rotating the valve body 200, enabling various thermal management modes to be implemented by varying the flows of cooling medium through the flow paths 210 in the first and second layers L1 and L2.

The cooling medium circulation apparatus constructed as described above is advantageous in terms of being installed in a vehicle in a compact structure, eliminating the need of multiple peripheral pipes, and facilitating the circulation of coolant across various cooling system components.

Particularly, arranging the thermal management components such as the reservoir and water pumper centrally around the housing, allowing selective coolant circulation to each thermal management component through a single valve and connection through each port without branch pipes offers advantages in terms of modularity for the cooling system components.

Although the present disclosure has been illustrated and described in connection with specific embodiments, it will be obvious to those skilled in the art that various modification and changes can be made thereto without departing from the spirit of the disclosure or the scope of the appended claims.

What is claimed is:

1. A cooling medium circulation apparatus for a vehicle, the cooling medium circulation apparatus comprising:
   a housing comprising a valve mounting device with an internal space and a plurality of ports connected to a plurality of thermal management components; and
   a valve body rotatably mounted in the valve mounting device, partitioned into a plurality of layers vertically, with a plurality of flow paths formed in each layer, and with a plurality of circulation holes formed on an outer side corresponding to each of the flow paths and selectively matching the ports, the circulation holes elongated vertically to have a height greater than a height of the flow paths.

2. The cooling medium circulation apparatus of claim 1, wherein the valve mounting device is formed to have an inner surface forming a cylindrical shape, and the valve body is formed to have an outer surface forming the cylindrical shape facing the inner surface of the valve mounting device.

3. The cooling medium circulation apparatus of claim 1, further comprising an actuator connected to an upper or lower part of the housing to rotate the valve body to selectively establish a connection between the circulation holes of the valve body and the ports of the housing.

4. The cooling medium circulation apparatus of claim 1, wherein the plurality of ports are arranged at intervals on an outer surface of the valve mounting device.

5. The cooling medium circulation apparatus of claim 1, wherein the flow paths formed in one layer are separated from, or vertically overlapped with, the flow paths formed in another layer.

6. The cooling medium circulation apparatus of claim 1, wherein the circulation holes are cut to be recessed inward at a portion connected to the flow paths.

7. The cooling medium circulation apparatus of claim 1, further comprising a sealing member disposed between an inner surface of the valve mounting device and an outer surface of the valve body, the sealing member comprising through-holes corresponding to the circulation holes.

8. The cooling medium circulation apparatus of claim 7, wherein the sealing member is cylindrical and is fixed in position when inserted into the valve mounting device, allowing the valve body to rotate relative to the sealing member.

9. The cooling medium circulation apparatus of claim 7, wherein the sealing member is provided with the through-holes in multiple quantities to match the quantities of the ports.

10. The cooling medium circulation apparatus of claim 7, wherein the ports of the housing are arranged at regular intervals, and the through-holes of the sealing member are arranged to match each port of the housing, allowing the distance between the through-holes to be also regularly spaced.

11. The cooling medium circulation apparatus of claim 7, wherein the circulation holes of the flow paths formed in one layer of the valve body and the circulation holes of the flow paths formed in another layer are alternately arranged along the outer surface of the valve body, and the through-holes within the sealing member are formed in fewer quantities than the circulation holes of the valve body and are arranged at intervals to match the circulation holes of the flow paths formed in one layer or the flow paths formed in another layer of the valve body, depending on rotational position of the valve body.

12. The cooling medium circulation apparatus of claim 1, wherein the valve mounting device is open at a top or a bottom thereof, with a sloped inner surface that gradually widens in an open direction.

13. The cooling medium circulation apparatus of claim 12, wherein the valve body is formed with a sloped outer surface matching the sloped inner surface of the valve mounting device.

14. The cooling medium circulation apparatus of claim 12, wherein the housing comprises a contact member having elastic and abrasion-resistant properties at the open portion of the valve mounting device to support the valve body.

15. The cooling medium circulation apparatus of claim 1, wherein the thermal management components comprise a water pump, and the housing comprises a mounting portion formed on a side thereof for attaching the water pump, and the mounting portion comprises a water pump port communicating with the water pump.

16. The cooling medium circulation apparatus of claim 15, wherein the water pump port has a height smaller than a height of a through-hole of the valve body, and the water pump port is positioned at a center of one of the circulation holes of the valve body.

17. The cooling medium circulation apparatus of claim 16, further comprising a sealing member disposed between an inner surface of the valve mounting device and an outer surface of the valve body,
   wherein the sealing member comprises through-holes corresponding to the circulation holes and having a height larger than the height of the water pump port and smaller or equal to the height of the circulation hole.

18. The cooling medium circulation apparatus of claim 16, wherein the plurality of circulation holes are arranged, while one circulation hole is in an open state matched with the water pump port during the rotation of the valve body, for another circulation hole to be positioned to match the same water pump port and switch to the open state before the closure of the one circulation hole.

19. The cooling medium circulation apparatus of claim 1, further comprising a reservoir attached to an upper part or lower part of the housing and storing the cooling medium.

20. A vehicle comprising the cooling medium circulation apparatus of claim 1.

* * * * *